United States Patent [19]

Knackstedt et al.

[11] 4,388,268
[45] Jun. 14, 1983

[54] TRANSPORTATION AND/OR STORAGE CONTAINERS FOR RADIOACTIVE MATERIALS

[75] Inventors: Hans-Günther Knackstedt, Langenselbold; Erhard Müller, Grundau; Richard Christ, Bruchköbel; Hartmut Kroll, Hanau, all of Fed. Rep. of Germany

[73] Assignee: Transnuklear GmbH, Hanau, Fed. Rep. of Germany

[21] Appl. No.: 207,359

[22] Filed: Nov. 17, 1980

[30] Foreign Application Priority Data

Nov. 17, 1979 [DE] Fed. Rep. of Germany ... 7932527[U]

[51] Int. Cl.³ .............................................. G21C 19/00
[52] U.S. Cl. .................................. 376/272; 250/506.1
[58] Field of Search ....................... 376/272; 250/506

[56] References Cited

U.S. PATENT DOCUMENTS

| 3,727,060 | 4/1973 | Blum | 250/506 |
| 3,731,101 | 5/1973 | Peterson | 376/272 |
| 3,780,306 | 12/1973 | Anderson | 260/506 |
| 4,218,622 | 8/1980 | McMurty | 376/272 |

FOREIGN PATENT DOCUMENTS

2065863 9/1976 Fed. Rep. of Germany.

*Primary Examiner*—Donald P. Walsh
*Attorney, Agent, or Firm*—Cushman, Darby & Cushman

[57] ABSTRACT

Conveying and/or storage containers for radioactive materials which emit gamma and neutron radiation consist essentially of a container body having a shielding function for gamma radiation, cooling fins and a neutron shielding arranged between the cooling fins. For the protection of the neutron shielding it is provided with a cover.

7 Claims, 4 Drawing Figures

TRANSPORTATION AND/OR STORAGE CONTAINERS FOR RADIOACTIVE MATERIALS

BACKGROUND OF THE INVENTION

The invention is directed to a conveying and/or storage container for radioactive materials which produce $\gamma$ and neutron radiation emissions and noteworthy residual heat, essentially consisting of a container body having shielding function for $\gamma$-radiation, a neutron shielding and cooling fins whereby the neutron shielding is arranged between the bar shaped fins.

Containers which are employed for conveying and/or storing spent fuel elements must safely confine the radioactivity of the inserted material and demonstrate in strength tests that this is also guaranteed in extreme accident situations. However, simultaneously they must also shield off the gamma and neutron rays which are set free in the radioactive decay reactions and carry off the heat of decay to the outside.

Known shielding containers generally consist of a metallic base container with the required mechanical strength and the required wall thickness for shielding the gamma rays are customarily made of steel or a combination of lead and steel and an outer shell of neutron shielding material, generally small polyethylene spheres cast in synthetic resin.

Normally there are welded or soldered heat conducting bars or fins which penetrate the resin layer to the metallic base body. They are necessary for enlargement of the metallic surface in containers which are designed for a high thermal efficiency and for dissipating the heat through the generally poor heat conducting neutron shielding layer.

It is a disadvantage of these constructions that even slight collisions of the containers, which can occur even in routine operation, can lead to damage of the heat conducting fins and the resin layer and accordingly require an expensive repair of the entire container. Further disadvantageous situations appear in the purification and decontamination.

A further disadvantage of this known shielding container is that the thickness of the neutron shielding must be designed for the maximum planned conveyance, thus it is not variable.

This is also true for containers in which neutron absorbing material is accommodated in bores in the metallic base body.

In German OS No. 2065863 there is reported about neutron shielding molded pieces, inter alia wooden boards or corresponding hydrogen containing materials, in a given case injected with boron, whereby these molded pieces are located between the cooling fins and are clamped to the base body. Substantial disadvantages, however, are the combustibility, the variable water content in using wood, the unfavorable thermal conductivity and the limited neutron absorption properties. The decontamination is difficult. The gaps between the molded bodies and the cooling fins are typically inadmissible traps of contamination.

Therefore, it was the problem of the present invention to produce a container for radioactive materials, consisting essentially of a container body having a shielding function for $\gamma$-radiation, a neutron shielding and cooling fins wherein the neutron shielding is arranged between the bar shaped cooling fins, in which the neutron shielding is protected and is variably adjustable, furthermore is favorable to the dissipation of heat and requires little maintenance while avoiding the described disadvantages.

SUMMARY OF THE INVENTION

This problem was solved according to the invention by providing the neutron shielding arranged between the cooling fins with a covering.

BRIEF DESCRIPTION OF THE DRAWINGS

In the drawings like numerals refer to like parts.

Figure 1:
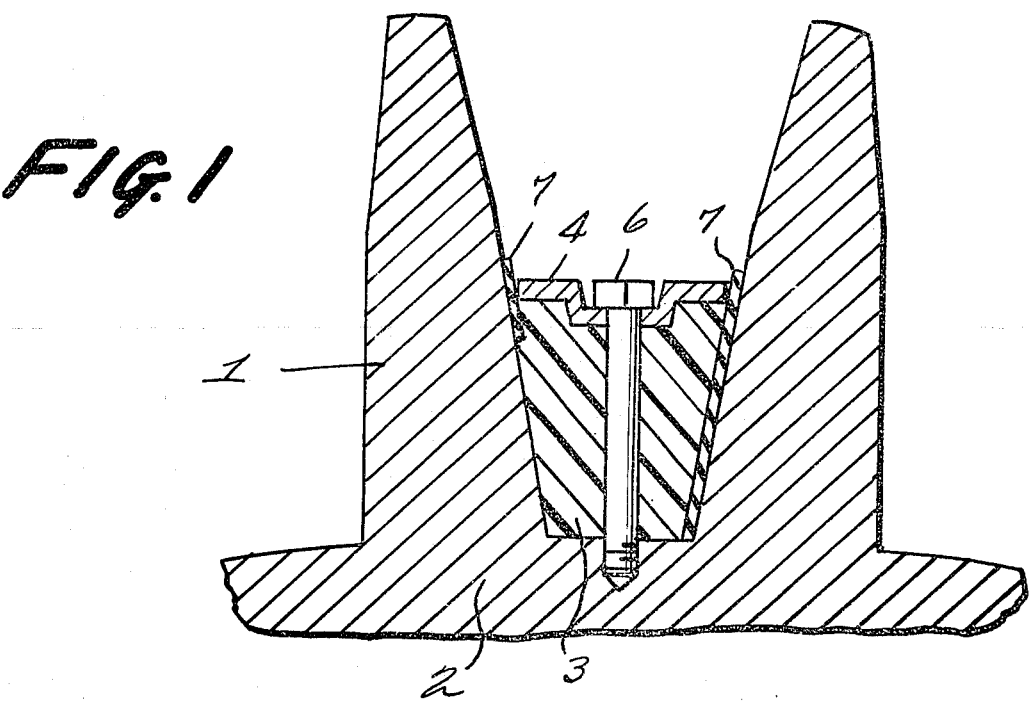
FIG. 1 is a schematic illustration of the container body of the invention.
Figure 2:
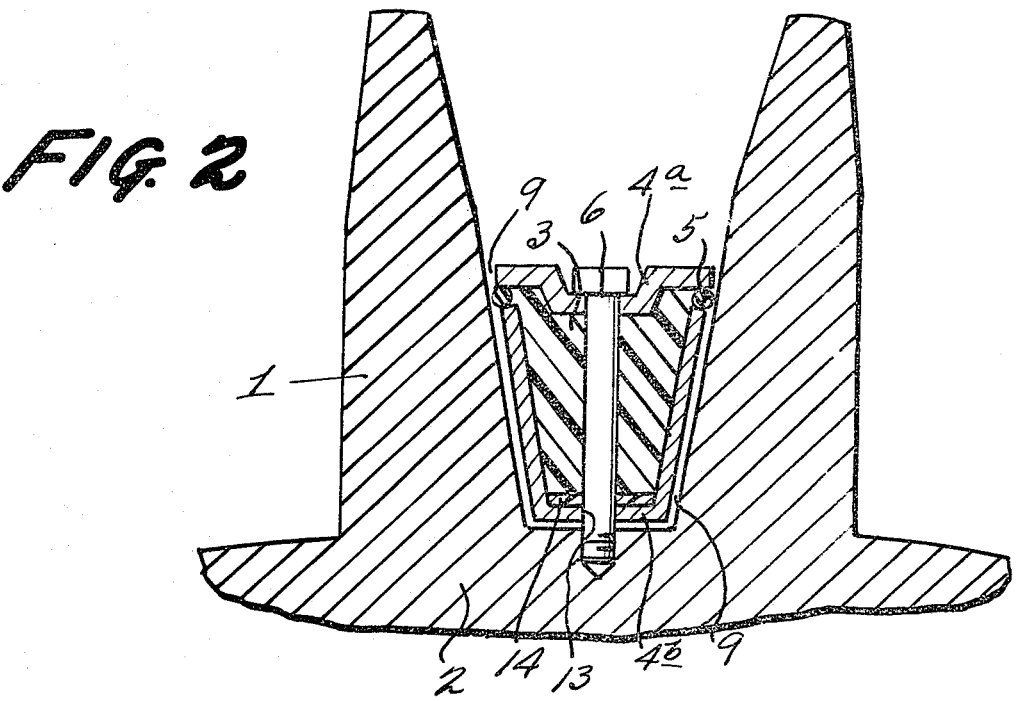
FIG. 2 is a schematic illustration of an alternate container body of the invention.
Figure 3:
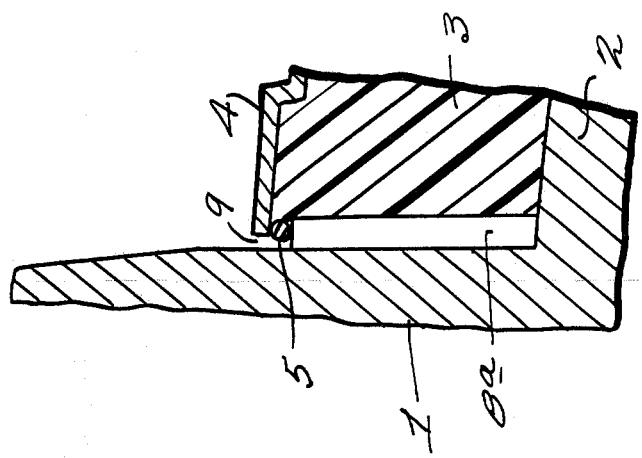
FIG. 3 is a schematic illustration of an alternate container according to the invention.
Figure 3:
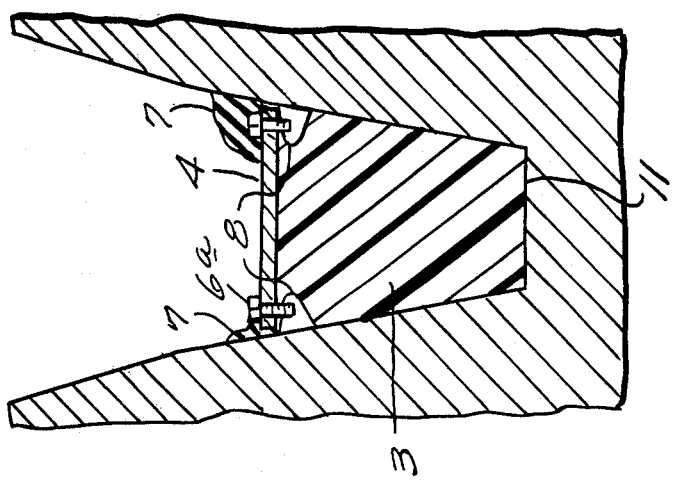
Figure 3:
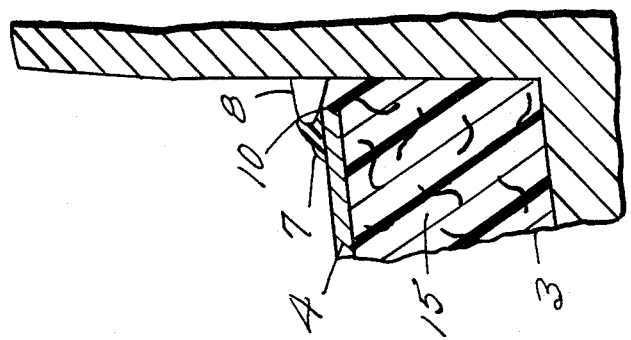
Figure 4:
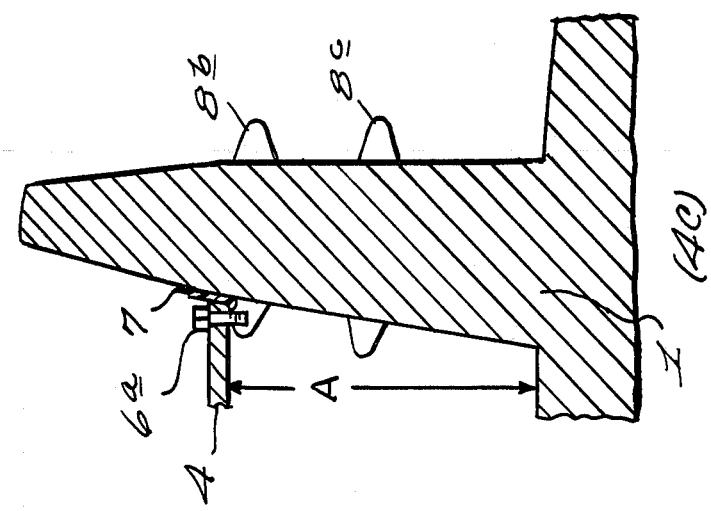
FIG. 4 is a schematic illustration of another container according to the invention.
Figure 4:
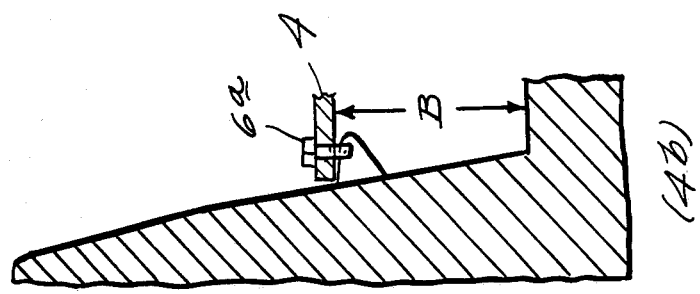
Figure 4:
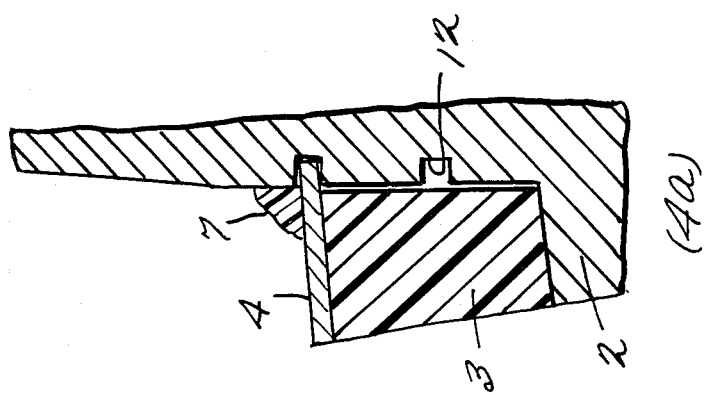

The containers of the invention can comprise, consist essentially of or consist of the stated elements.

DETAILED DESCRIPTION

Referring more specifically to the drawings the neutron shielding 3 is disposed between the bar shaped cooling fins or flange 1. The neutron shielding 3 is covered by the covering 4 which is clamped between the cooling fins 1. It has proven favorable to make the covering of metal, e.g. stainless steel and secured to the conveying and/or storage container by bolts 6. The bolt head can be covered, e.g. by a removable cast composition.

In an advantageous development of the apparatus of the invention the neutron shielding 3 is covered on all sides in which case the covering 4 consists essentially of a top covering portion 4a and a lower covering portion 4b, which are mutually sealed by means of a sealing element (e.g. an o-ring) 5. If necessary, the opening 13 is covered with an easily penetratable film 14 (or other material) before inserting the neutron shielding 3.

In several cases it has also proven particularly advantageous to place on the cooling fins 1 nose-like bosses 8, particularly as boss 8a extending up to the container body surface 11. The bosses (8 respectively 8a) represent supports or abutments on which the covering 4 can be secured by force fit 10 or by bolts 6a. Molded and cast on bosses 8, particularly have been proven good in industrial production. The bosses 8 also can be installed on the cooling fins 1 in several rows 8b and 8c. Therewith there appear variable possibilities for securing the covering 4 which adjust to the variable volumes of the neutron shielding 4 according to the heights A or B according to the requirements of the radioactive materials to be conveyed or stored.

It has been found that it is also favorable if the covering 4 is led into grooves which are located in the cooling fins 1. In this manner the neutron shielding 3 is completely effective over the entire free cross-section between the cooling fins.

It has proven particularly advantageous to fill up the gap 9 between the covering 4 and the cooling fins 1 or the bosses 8 with water-tight elastic material 7 such as silicone rubber (or other material). The heads of the bolts 6, 6a can also be covered with the same material.

Via the joining of covering 4, cooling fins 1 or container body 2 by means of bolts 6, 6a there is also attained a favorable dissipation of the after heat of the radioactive material found in the container.

It is particularly advantageous to make the covering 4 of metal (e.g. iron or steel) with neutron absorbing additives, as e.g. cadmium, boron or suitable rare earths, e.g. gadolinium or samarium.

It is possible with the container of the invention to also provide for suitable powdery material as neutron shielding 3 between the cooling fins. As powdery, neutron absorbing material there can be used e.g. a mixture of graphite and gadolinium oxide. This type of mixture also has favorable heat conducting properties. This mixture is additionally compacted by vibration.

The heat conductivity of the neutron shielding 3 is particularly advantageously improved by mixing in good conducting whiskers or chips 15 (e.g. of metal such as iron or steel).

It is possible with the present invention to protect the neutron shielding 3 against contamination, moisture, corrosion and damage, furthermore in a simple way to adjust the neutron shielding 3 variably according to the needs which result from the radioactive material found in the container, whereby powdery neutron shielding also can be used. The dissipation of heat likewise is favorably improved through the present invention. Repair operations on the neutron shielding can be carried out reliably as well as with savings of cost and time.

The invention has proven good for containers having longitudinally arranged cooling fins. However, it is also conveniently usable with containers having transverse fins. The covering 4 or the upper covering portion 4a and lower covering portion 4b also can be so partitioned that there results a number of covered neutrons shielding segments or portions suitably adjusted according to the situation present.

The entire disclosure of German priority application G 7932527.2 is hereby incorporated by reference.

We claim:

1. A container suitable for conveyance and/or storage of radioactive materials which produce gamma and neutron radiation and significant residual heat, comprising, in combination, a container body having shielding means for gamma radiation, neutron shielding means and bar-shaped cooling fins, said container having an exterior surface, said cooling fins extending outwardly from said exterior surface and having spaces each therebetween, each said cooling fin having a pair of opposite side surfaces on each of which are disposed a boss means intermediate the ends of each said cooling fin, said neutron shielding means including a plurality of segments with a said segment disposed in the space between adjacent ones of said cooling fins, cover means overlying each of said segments, said boss means of each said cooling fin contacting a portion of a respective said cover means to hold said cover means in place on said respective segment of neutron shielding means.

2. A container according to claim 1 wherein the covering is made of metal.

3. A container according to claim 2 wherein the covering encloses the neutron shielding on all sides.

4. A container according to claim 3 wherein the covering comprises an upper covering portion and a lower covering portion and there is provided sealing means for mutually sealing the upper covering portion and the lower covering portion.

5. A container according to claim 1 wherein there is a gap between the cooling fins and the covering and the gap is filled with a water-tight, elastic material.

6. A container according to claim 2 wherein the neutron shielding consists essentially of powdery material.

7. A container according to claim 6 wherein the neutron shielding includes good heat conducting whiskers or chips dispersed therethrough.

* * * * *